(12) United States Patent
Minnick et al.

(10) Patent No.: US 8,386,339 B2
(45) Date of Patent: Feb. 26, 2013

(54) ORDERING VIA DYNAMIC MATRIX CODE GENERATION

(75) Inventors: Dan J. Minnick, Littleton, CO (US); Michael T. Dugan, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 269 days.

(21) Appl. No.: 12/953,273

(22) Filed: Nov. 23, 2010

(65) Prior Publication Data

US 2012/0130851 A1    May 24, 2012

(51) Int. Cl.
*G06Q 30/00* (2012.01)
*H04N 7/173* (2011.01)

(52) U.S. Cl. .................. 705/26.81; 705/26.8; 725/133; 725/134; 725/141; 725/142

(58) Field of Classification Search ................. 705/26.1, 705/26.8, 26.81; 725/87, 104, 131, 133, 725/134, 139, 141, 142
See application file for complete search history.

(56) References Cited

U.S. PATENT DOCUMENTS

| | | | |
|---|---|---|---|
| 5,510,603 A | 4/1996 | Hess et al. | |
| 5,581,636 A | 12/1996 | Skinger | |
| 5,703,349 A | 12/1997 | Meyerson et al. | |
| 5,978,855 A | 11/1999 | Metz et al. | |
| 6,006,990 A | 12/1999 | Ye et al. | |
| 6,058,238 A | 5/2000 | Ng | |
| 6,556,273 B1 | 4/2003 | Wheeler et al. | |
| 7,206,409 B2 * | 4/2007 | Antonellis et al. | 380/202 |
| 7,328,848 B2 | 2/2008 | Xia et al. | |
| 7,387,250 B2 * | 6/2008 | Muni | 235/462.01 |
| 7,394,519 B1 | 7/2008 | Mossman et al. | |
| 7,424,976 B2 | 9/2008 | Muramatsu | |
| 7,604,172 B2 | 10/2009 | Onogi | |
| 7,624,417 B2 | 11/2009 | Dua | |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

Costedio, Katrina, "Bluefly QR Codes Debut on TV," 2 pp. Found online at http://www.barcode.com/Mobile-Barcod-News/bluefly-qr-codes-debut-on-tv.html, Oct. 22, 2010.*

(Continued)

*Primary Examiner* — Nicholas D Rosen
(74) *Attorney, Agent, or Firm* — Kilpatrick Townsend & Stockton LLP

(57) ABSTRACT

A content receiver receives ordering information from a content provider for orderable content or products. The content receiver also derives information specific to the content receiver and dynamically generates a matrix code including the ordering information and the specific information. The content receiver then transmits the matrix code to a display and when the displayed matrix code is detected and decoded by a reader, the reader initiates an order for the orderable content to be transmitted to the content receiver or products. In some implementations, the orderable content may be ordered from the content provider, which may then transmit the ordered content to the content receiver. However, in other implementations the orderable content may be ordered from a third party provider. As such, the third party provider may transmit the ordered content to the content provider, which may then transmit it to the content receiver.

20 Claims, 6 Drawing Sheets

U.S. PATENT DOCUMENTS

| | | |
|---|---|---|
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 2001/0037297 A1 | 11/2001 | McNair |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0044532 A1 | 3/2004 | Karstens |
| 2005/0015800 A1 | 1/2005 | Holcomb |
| 2005/0125301 A1 | 6/2005 | Muni |
| 2005/0262548 A1 | 11/2005 | Shimojo et al. |
| 2005/0264694 A1 | 12/2005 | Ilan et al. |
| 2006/0079247 A1 | 4/2006 | Ritter |
| 2006/0086796 A1 | 4/2006 | Onogi |
| 2006/0124742 A1 | 6/2006 | Rines et al. |
| 2006/0196950 A1 | 9/2006 | Kiliccote |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0077324 A1 | 3/2008 | Hatano et al. |
| 2008/0092154 A1 | 4/2008 | Hogyoku |
| 2008/0156879 A1 | 7/2008 | Melick et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0267537 A1 | 10/2008 | Thuries |
| 2008/0281624 A1 | 11/2008 | Shibata |
| 2009/0031373 A1 | 1/2009 | Hogyoku |
| 2009/0083808 A1 | 3/2009 | Morrison |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1* | 6/2009 | Nagamoto et al. ............... 705/27 |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li et al. |
| 2009/0212113 A1 | 8/2009 | Chiu et al. |
| 2009/0254954 A1 | 10/2009 | Jeong |
| 2009/0303036 A1 | 12/2009 | Sahuguet |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0060802 A1* | 3/2010 | Huegel ......................... 348/734 |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2011/0039573 A1 | 2/2011 | Hardie |
| 2011/0065451 A1 | 3/2011 | Danado et al. |
| 2011/0208710 A1 | 8/2011 | Lesavich |
| 2011/0264527 A1 | 10/2011 | Fitzpatrick et al. |
| 2011/0282727 A1 | 11/2011 | Phan et al. |
| 2012/0128267 A1 | 5/2012 | Dugan et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0155838 A1 | 6/2012 | Gerhards et al. |
| 2012/0159563 A1 | 6/2012 | Gomez et al. |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |

FOREIGN PATENT DOCUMENTS

| | | | |
|---|---|---|---|
| DE | 10 2007 038 810 A1 | | 2/2009 |
| EP | 1 021 035 A1 | | 7/2000 |
| EP | 1 383 071 A2 | | 1/2004 |
| EP | 1 724 695 A1 | | 11/2006 |
| EP | 1 768 400 A2 | | 3/2007 |
| EP | 2 079 051 A1 | | 7/2009 |
| EP | 2 131 289 A1 | | 12/2009 |
| EP | 2 439 936 A2 | | 4/2012 |
| FR | 2 565 748 A1 | | 12/1985 |
| GB | 2 044 446 A | | 10/1980 |
| GB | 2 165 129 A | | 4/1986 |
| GB | 2 325 765 A | | 12/1998 |
| GB | 2 471 567 A | | 1/2011 |
| JP | 2008 244556 A | | 10/2008 |
| KR | 2004 0087776 A | | 10/2004 |
| WO | 95/27275 A1 | | 10/1995 |
| WO | 97/41690 A1 | | 11/1997 |
| WO | 01/18589 A1 | | 3/2001 |
| WO | 01/58146 A2 | | 8/2001 |
| WO | 2005/109338 A1 | | 11/2005 |
| WO | 2007/009005 A1 | | 1/2007 |
| WO | 2009/057651 | | 5/2009 |
| WO | 2009/144536 A1 | | 12/2009 |
| WO | 2011/009055 A2 | | 1/2011 |

OTHER PUBLICATIONS

"Android App Reviews & Showcase Just a Tapp Away," Android Tapp, 10 pp. Found online at http://www.androidtapp.com/download-the-weather-channel-android-app-from-your-tv/, Oct. 22, 2010.

"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.

"Fox TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.

"Fox's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.
jsp?url=http%3A%2F%2Fieeexplore.ieee.org%2Fie . . . , Oct. 22, 2010.
Smith, Lindsay, "Barcodes Make History on Global TV", 3 pp. Found online at http://www.lindsaysmith.com/worlds-first-mobio-mini-telethon/, Oct. 22, 2010.
Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.
Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.
Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.
International Search Report and Written Opinion of PCT/US11/59977 mailed on Mar. 19, 2012, 7 pages.
International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.
Byford, D., "Universal Interactive Device," International Business Machines Corporation, Jun. 1998, 1 page.
International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., " Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.

* cited by examiner

ORDERING VIA DYNAMIC MATRIX CODE GENERATION

FIELD OF THE INVENTION

This disclosure relates generally to content receivers, and more specifically to simplified ordering utilizing matrix codes dynamically generated by a content receiver.

SUMMARY

The present disclosure discloses systems and methods for ordering utilizing dynamic matrix code generation. A content receiver may receive an identifier (which may identify ordering information for an instance of content that a user may order to be transmitted to the content receiver or products) from a content provider. The content receiver may also derive information specific to the content receiver and dynamically generate a matrix code, such a QR code, that includes the ordering information and the information specific to the content receiver. The content receiver may then transmit the matrix code to a display device and when the matrix code displayed on the display device is detected and decoded by a reader device, the reader device may initiate an order for the instance of content to be transmitted to the content receiver or for the products. As such, the user may be able to more conveniently and less burdensomely order and receive the desired content or products.

In some implementations, the instance of content may be ordered from the content provider, which may then transmit the ordered content to the content receiver. However, in other implementations the instance of content may be ordered from a third party content provider. As such, the third party content provider may transmit the ordered content to the content provider, which may then in turn transmit the received ordered content to the content receiver.

In various implementations, the reader device may present a confirmation message after detecting and decoding the one or more matrix codes. The confirmation screen may detail the order for the at least one instance of content to be initiated and may request user input to confirm the order. The confirmation screen may or may not also request additional information for completing the order. In some of these implementations, the reader device may present the confirmation message prior to initiating the order for the at least one instance of content and may initiate the order when user input corresponding to a confirmation is received. In other of these implementations, the provider of the instance of content may transmit the confirmation message to the reader device after receiving the initiated order and may transmit the ordered instance of content after receiving the user input corresponding to a confirmation.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
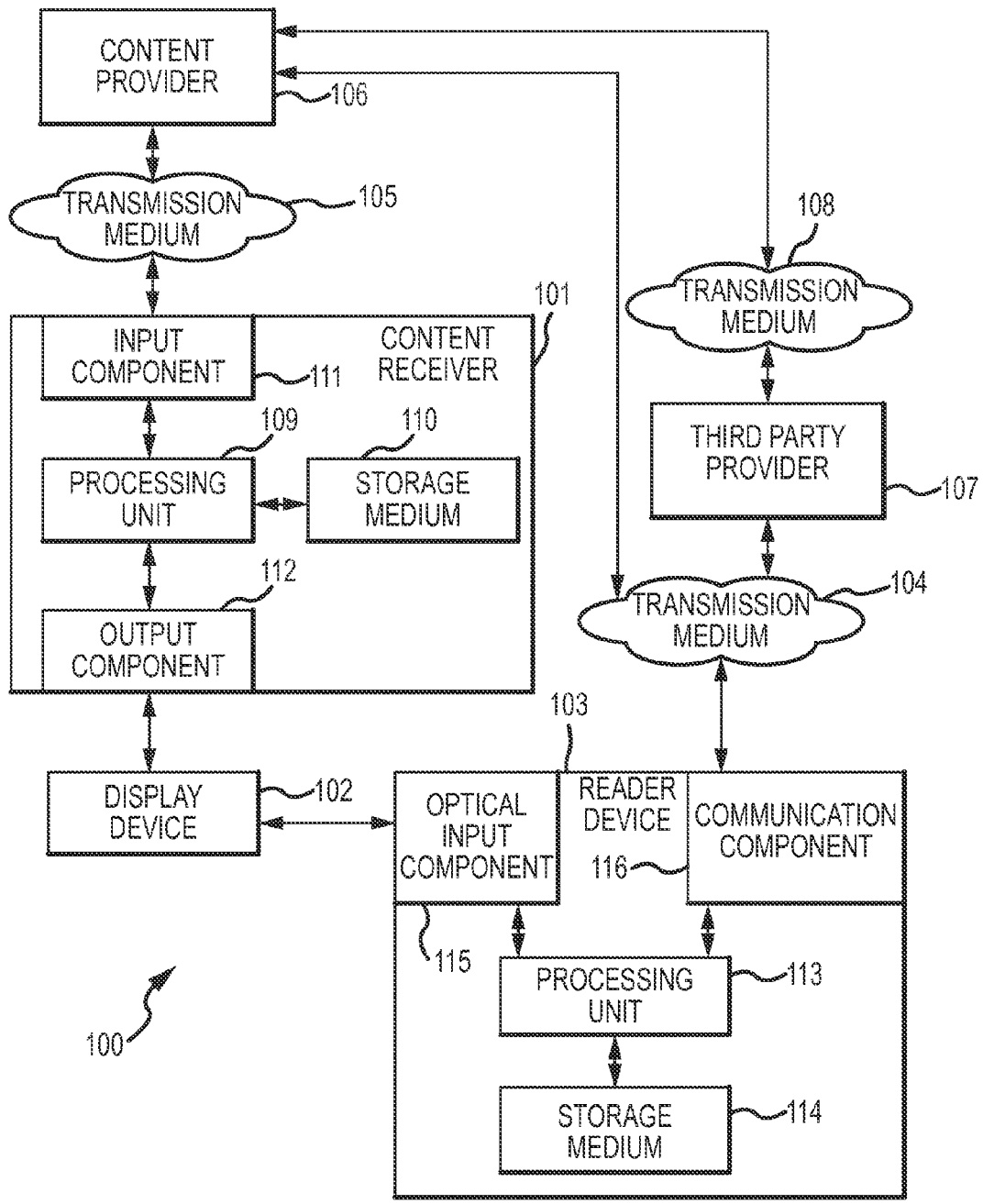
FIG. 1 is a block diagram illustrating a system for content ordering utilizing dynamic matrix code generation.

The description that follows includes sample systems, methods, and computer program products that embody various elements of the present disclosure. However, it should be understood that the described disclosure may be practiced in a variety of forms in addition to those described herein.

Content receivers (such as television receivers, set top boxes, television tuners, digital video recorders, and so on) typically receive content (such as television programming content, movie content, music content, video on-demand, pay-per-view content, and so on) from a content provider (such as a cable television programming provider, a satellite television programming provider, a satellite radio provider, an Internet service provider, a video on-demand movie provider, a pay-per-view movie provider, and so on) via a communication connection (such as a coaxial cable connection, a satellite connection, a wired Internet connection, a wireless Internet connection, a cellular connection, and so on). Such a content receiver may then transmit received content to a presentation device such as a television, a speaker, and so on.

Some content received by content receivers from content providers may be broadcast by the content provider to a number of content receivers. As such, the broadcast content may be available via a content receiver regardless whether or not a user of the content receiver orders the broadcast content. Additionally, a user of the content receiver may be able to transmit an order for additional content (whether for free, purchase, rental, and so on) which may then be sent to the content receiver or products which may then be sent to a user location. Additional content which may be ordered for a content receiver may include on-demand programming that is orderable from the content provider or a third party provider, pay-per-view programming that is orderable from the content provider or a third party provider, and so on.

However, in order for a user to order additional content or products the user generally must communicate with the content provider or third party provider regarding the additional content or products which the user desires to order. Some content receivers may be able to send communications to an associated content provider in order for a user to order additional content, but may still be unable to send communications to separate third party providers in order for the user to be able to order additional content or products from such a source. Other content receivers may not be able to send communications at all being limited to receiving content, and may not enable users to order content or products at all. In either case, users may have to order content or products by placing an order via a telephone call, a web site, and so on.

In order to order content or products in such a manner, a user may be required to locate the appropriate information for contacting the provider of the content or products, actually contact the provider of the content or products utilizing the appropriate method, provide account information and other identifiers for the content receiver, and/or provider various financial information such as a credit card or other billing account number. Regardless of the exact procedures a user must follow and/or the exact information a user must provide, user's may find ordering content or products in this manner to be inconvenient and burdensome.

The present disclosure discloses systems and methods for ordering utilizing dynamic matrix code generation. A content receiver may receive one or more identifiers from a content provider. The identifiers may identify ordering information for one or more instances of content that a user may order to be transmitted to the content receiver or products. The content receiver may also derive information specific to the content receiver (such as content receiver identifiers, customer identifiers, subscriber account identifiers, user financial information, and so on). Then, the content receiver may dynamically generate one or more matrix codes (such as one or more QR codes) that include the ordering information and the information specific to the content receiver and transmit the matrix codes to a display device. When the matrix codes displayed on the display device are detected and decoded by a reader device (such as a matrix code reader application executing on a smart phone), the reader device may initiate an order for the one or more instances of content to be transmitted to the content receiver or products to be sent to a user location. As such, the user may be able to more conveniently and less burdensomely order and receive the desired content or products.

FIG. 1 is a block diagram illustrating a system 100 for content ordering utilizing dynamic matrix code generation. The system 100 may include a content receiver 101 which may receive content from a content provider 106 via a transmission medium 105 and then transmit the received content to at least one display device 102. Additionally, the system 100 may include a reader device 103 which may communicate with the content provider via a transmission medium 104. The content receiver may be any kind of content receiver such as a television receiver, a set top box, a digital video recorder, and so on. The display device may be any kind of display device such as a cathode ray tube display, a liquid crystal display, a television, a computer monitor, and so on. The reader device may be any kind of device capable of detecting and decoding a matrix code such as a telephone equipped with a camera, a mobile computing device that includes a camera, and so on). The transmission medium 104 and/or the transmission medium 105 may be any kind of communication connection such as such as a coaxial cable connection, a satellite connection, a WiFi connection, an Internet connection, an Ethernet connection, a cellular connection, and so on. Further, although the transmission medium 104 and the transmission medium 105 are illustrated as separate, it is understood that in various implementations the transmission medium 104 and/or the transmission medium 105 may constitute a single transmission medium.

The content receiver 101 may include one or more processing units 109, one or more one or more non-transitory storage media 110 (which may take the form of, but is not limited to, a magnetic storage medium; optical storage medium; magneto-optical storage medium; read only memory; random access memory; erasable programmable memory; flash memory; and so on), one or more input components 111, and one or more output components 112. Additionally, although the display device 102 is illustrated as separate from the content receiver, it is understood that in various implementations the display device may be incorporated into the content receiver. The processing unit of the content receiver may execute instructions stored in the non-transitory storage medium to receive content from the content provider 106 and then transmit the received content to the display device.

Moreover, the processing unit 109 may execute instructions stored in the non-transitory storage medium 110 to receive one or more content identifiers from the content provider 106 utilizing the input component 111, derive information specific to the content receiver 101, dynamically generate one or more matrix codes that include the ordering information and the information specific to the content receiver, and transmit the matrix codes to the display device 102 utilizing the output component 112. The one or more matrix codes may be one or more QR codes. The content identifiers may identify ordering information for one or more instances of content. Additionally, the content identifiers may be received along with the content received from the content provider, such as advertisements for one or more instances of content corresponding to the ordering information. The information specific to the content receiver may include information such as one or more content receiver identifiers, one or more content receiver network addresses, one or more customer identifiers associated with the content receiver, one or more subscriber account identifiers associated with the content receiver, account information for a content account associated with the content provider, user financial information or other financial information associated with the content receiver, and so on. The ordering information may include information for transmitting the information specific to the content receiver to a provider of the at least one instance of content to initiate order of the at least one instance of content (such as the address of a web site to which to transmit the information specific to the content receiver). In some implementations, the provider of the at least one instance of content may be the content provider.

Subsequently, the reader device 103 may optically detect the matrix code displayed by the display device 102 utilizing one or more optical input components 115 (such as a camera, a barcode reader, and so on), decode the information specific to the content receiver 101 and the content identifier, and initiate at least one order for the at least one instance of content to be transmitted to the content receiver 101 based on the decoded information. As part of initiating the order for the at least one instance of content, the reader device may transmit the information specific to the content receiver to the provider of the at least one instance of content (such as the content provider 106) utilizing one or more communication components 116 as specified by the content identifier. The reader device may include one or more processing units 113 which execute instructions stored in one or more non-transitory storage media 114 in order to perform the above described functions.

After the provider of the at least one instance of content (such as the content provider 106) receives the initiated order for the at least one instance of content from the reader device 103, the provider of the at least one instance of content may transmit the at least one content to the content receiver 101, which the content receiver may receive utilizing the input component 111. Subsequently, the content receiver may transmit the received at least one instance of content to the display device 102 for display.

In various implementations, the reader device 103 may present a confirmation message after detecting and decoding the one or more matrix codes via one or more display devices (not shown). The confirmation screen may detail the order for the at least one instance of content to be initiated and may request user input to confirm the order utilizing one or more input devices (not shown). The confirmation screen may or may not also request additional information for completing the order, such as credit card information, parental control passwords, and so on. In some of these implementations, the reader device may present the confirmation message prior to initiating the order for the at least one instance of content and may initiate the order when user input corresponding to a confirmation is received.

In other of these implementations, the reader device 103 may initiate the order without presenting a confirmation message by transmitting the information specific to the content receiver 101 to the provider of the at least one instance of content (such as the content provider 106). The provider of the at least one instance of content may then transmit a confirmation message to the reader device prior to transmitting the at least one instance of content to the content receiver. The reader device may then present the confirmation screen and transmit any user input corresponding to a confirmation to the provider of the at least one instance of content. When the provider of the at least one instance of content receives the user input corresponding to the confirmation, the provider of the at least one instance of content may then transmit the at least one instance of content to the content receiver.

Although the provider of the at least one instance of content has been described above as the content provider 106, in various implementations the provider of the at least one instance of content may be a third party provider of content other than the content provider (such as an on-demand or pay-per-view movie provider such as Netflix®, Amazon dot Com®, and so on). In such implementations, the system 100 may include the third party provider 107 which may be communicably connected to the reader device 103 via the transmission medium 104 and the content provider via a transmission medium 108 (as with the transmission medium 104 and the transmission medium 105, although the various transmission media are illustrated as separate, in various implementations they may constitute a single transmission medium). Hence, the reader device 103 may initiate the order for the at least one instance of content by transmitting the information specific to the content receiver to third party 107 via the communication component 116 as specified by the content identifier. The third party provider may then transmit the ordered at least one instance of content to the content provider which may then retransmit the ordered at least one instance of content to the content receiver 101. Additionally, prior to the third party transmitting the ordered at least one instance of content to the content provider, the third party provider and the content provider may exchange information regarding the order, the user, the content receiver, and so on (such as for the purpose of billing for the order of the at least one instance of content).

In various implementations, the content receiver 101 may transmit the one or more matrix codes by themselves to the display device 102 via the output component 112 for the display device to display only the one or more matrix codes at a particular time. However, in various other implementations (such as implementations where the electronic device is a television receiver, digital video recorder, or other such device that provides images to a display), the electronic device may transmit one or more images (such as a video stream) to the display device via the output component. In such implementations, the electronic device may combine the one or more matrix codes with the one or more images and transmit the combination to the display device via the output component.

Figure 2A:
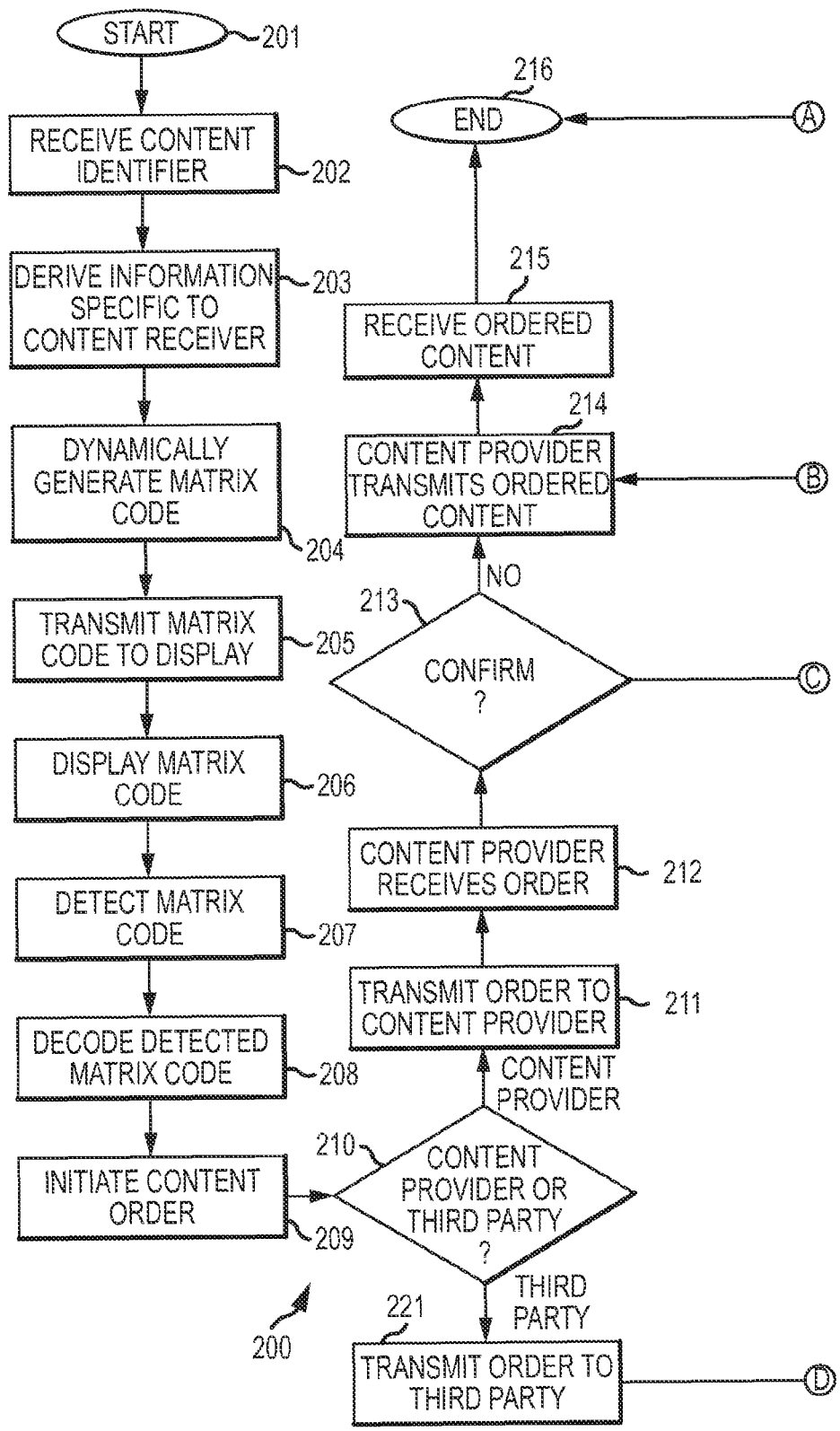
FIG. 2 is a flow chart illustrating a method for content ordering utilizing dynamic matrix code generation. This method may be performed by the system of FIG. 1.
Figure 2B:
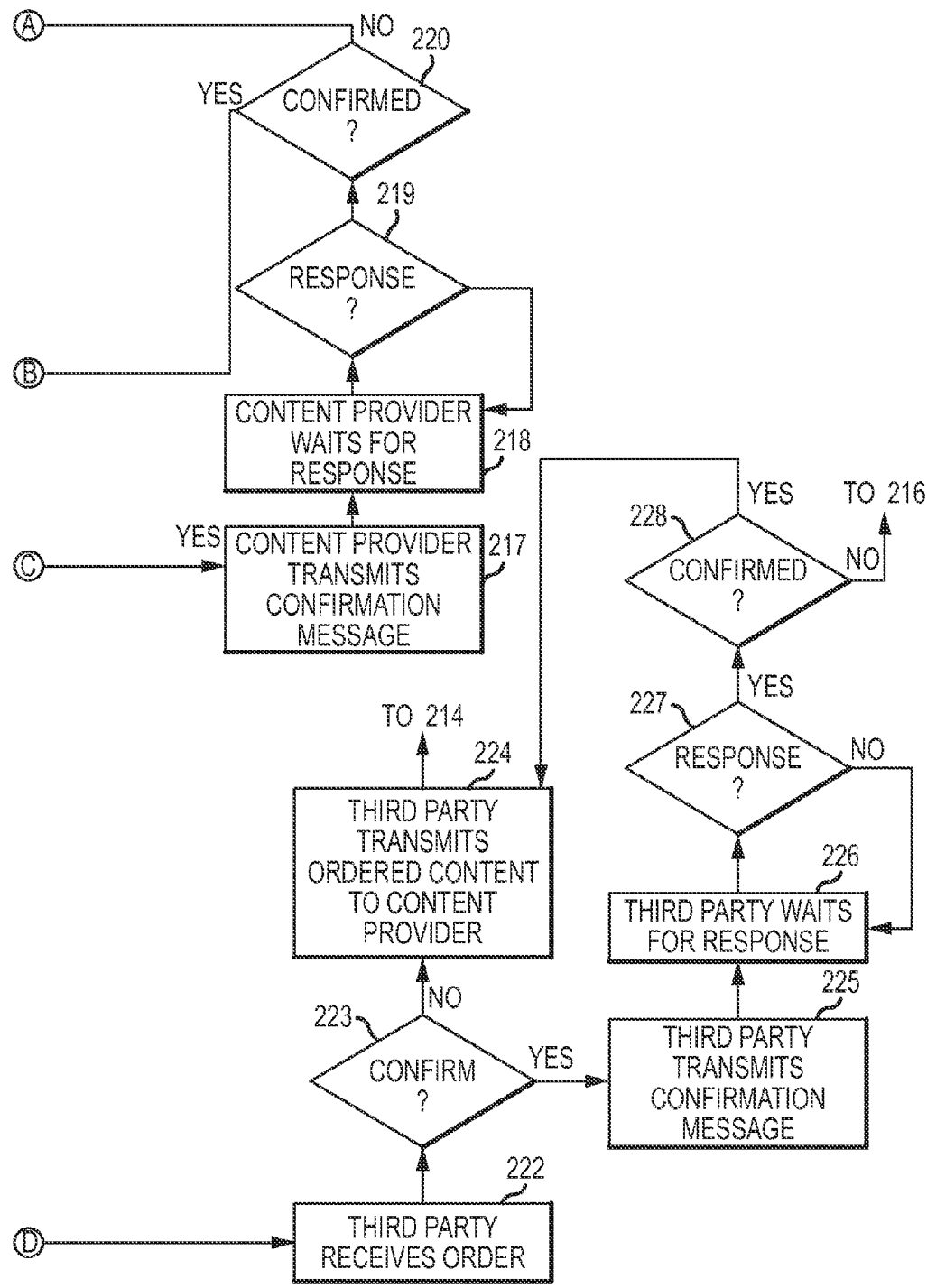

FIG. 2 illustrates a method 200 for content ordering utilizing dynamic matrix code generation. The method 200 may be performed by the system 100 of FIG. 1. The flow begins at block 201 and proceeds to block 202 where the processing unit 109 of the content receiver 101 receives the content identifier from the content provider 106 via the input component 111. The flow then proceeds to block 203 where the processing unit derives the information specific to the content receiver. Next, the flow then proceeds to block 204 where the processing unit dynamically generates a matrix code (such as a QR code) that includes the information specific to the content receiver and the content identifier. Then, the flow proceeds to block 205 where the processing unit transmits the dynamically generated matrix code to the display device 102 via the output component 112 before the flow proceeds to block 206.

At block 206, the display device 102 displays the matrix code that was transmitted by the processing unit 109 of the content receiver 101 via the output component 112. The flow then proceeds to block 207.

At block 207, the reader device 103 detects the matrix code displayed on the display device 102. The flow then proceeds to block 208 where the reader device decodes the detected matrix code. Decoding the detected matrix code may include decoding the information specific to the content receiver and the content identifier that is included in the matrix code. The flow then proceeds to block 209 where the reader device initiates an order for at least one instance of content as specified by the decoded content identifier. The flow then proceeds to block 210.

At block 210, the reader device 103 determines from the information included in the decoded content identifier whether to transmit the order for the at least one instance of content to the content provider 106 or the third party provider 107. If the content identifier specifies to transmit the order to the content provider, the flow proceeds to 211. Otherwise, the flow proceeds to block 221.

At block 211, after the reader device 103 determines that the content identifier specifies to transmit the order to the content provider 106, the reader device transmits the order to the content provider. The flow then proceeds to block 212 where the content provider receives the order before the flow proceeds to block 213. At block 213, the content provider determines whether or not to confirm the transmitted order (which may be based on whether the content identifier specified to confirm the order before transmittal of the at least one instance of content). If the content provider determines not to confirm the order, the flow proceeds to block 214. Otherwise, the flow proceeds to block 217.

At block 214, after the content provider 106 determines not to confirm the order, the content provider transmits the ordered content to the content receiver 101 and the flow proceeds to block 215. At block 215, the content receiver receives the ordered at least one instance of content. The flow then proceeds to block 216 and ends.

At block 217, after the content provider 106 determines to confirm the order, the content provider transmits a confirmation message to the reader device 103 and the flow proceeds to block 218. At block 218, the content provider waits for a response to the transmitted confirmation message and the flow proceeds to block 219. At block 219, the content provider determines whether or not a response to the confirmation message has been received from the reader device. If not, the flow returns to block 218 where the content provider continues to wait to receive a response to the confirmation message. Otherwise, the flow proceeds to block 220 where the content provider determines whether or not the response to the confirmation message confirms the order. If so, the flow proceeds to block 214 where the content provider transmits the ordered content to the content receiver 101. Otherwise, the flow proceeds to block 216 and ends.

At block 221, after the reader device 103 determines that the content identifier specifies to transmit the order to the third party provider 107, the reader device transmits the order to the third party provider. The flow then proceeds to block 222 where the third party provider receives the order before the flow proceeds to block 223. At block 223, the third party provider determines whether or not to confirm the transmitted order (which may be based on whether the content identifier specified to confirm the order before transmittal of the at least one instance of content). If the third party provider determines not to confirm the order, the flow proceeds to block 224. Otherwise, the flow proceeds to block 225.

At block 224, after the third party provider 107 determines not to confirm the order, the third party provider transmits the ordered content to the content provider 106 and the flow proceeds to block 214.

At block 225, after the third party provider determines to confirm the order, the third party provider transmits a confirmation message to the reader device 103 and the flow proceeds to block 226. At block 226, the third party provider waits for a response to the transmitted confirmation message and the flow proceeds to block 227. At block 227, the third party provider determines whether or not a response to the confirmation message has been received from the reader device. If not, the flow returns to block 226 where the third party provider continues to wait to receive a response to the confirmation message. Otherwise, the flow proceeds to block 228 where the third party provider determines whether or not the response to the confirmation message confirms the order. If so, the flow proceeds to block 224 where the third party provider transmits the ordered content to the content provider. Otherwise, the flow proceeds to block 216 and ends.

It should be understood that the specific steps as well as the specific order or hierarchy of steps described in method 200 is an example of a sample approach. In other implementations, some of the specific steps as well as the specific order or hierarchy of steps in the method may be rearranged while remaining within the disclosed subject matter.

Figure 3A:
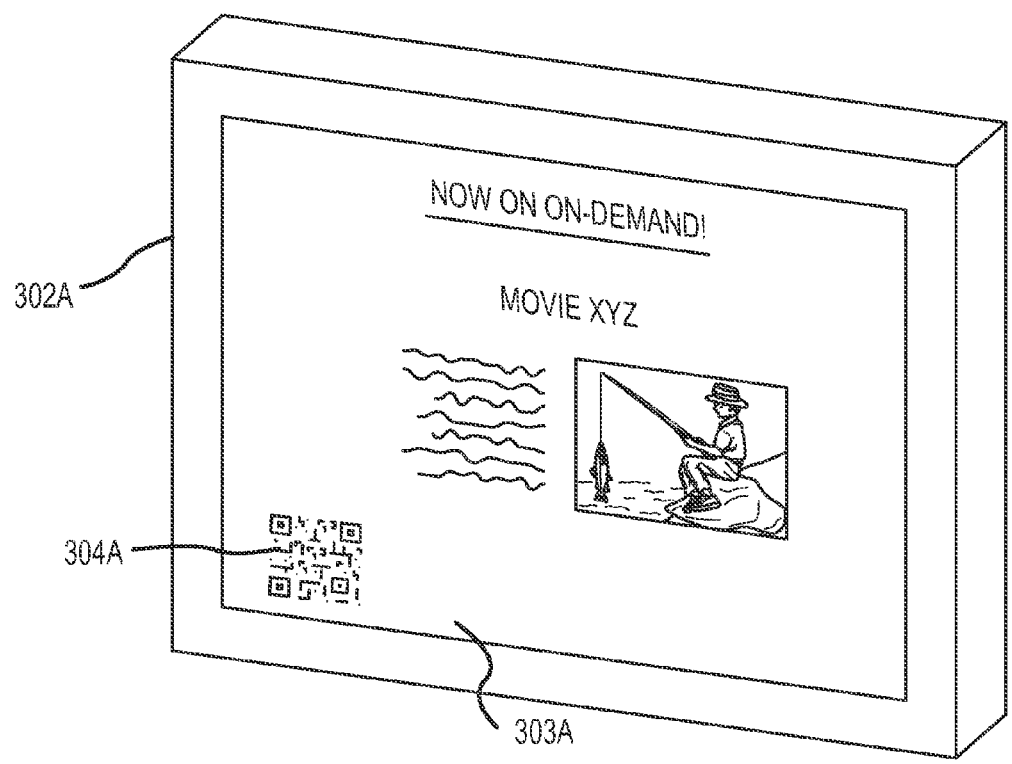
FIGS. 3A-3C are diagrams illustrating a system where a user utilizes a matrix code dynamically generated by a television receiver of a television to order content for the television. The system may be the system of FIG. 1.
Figure 3A:
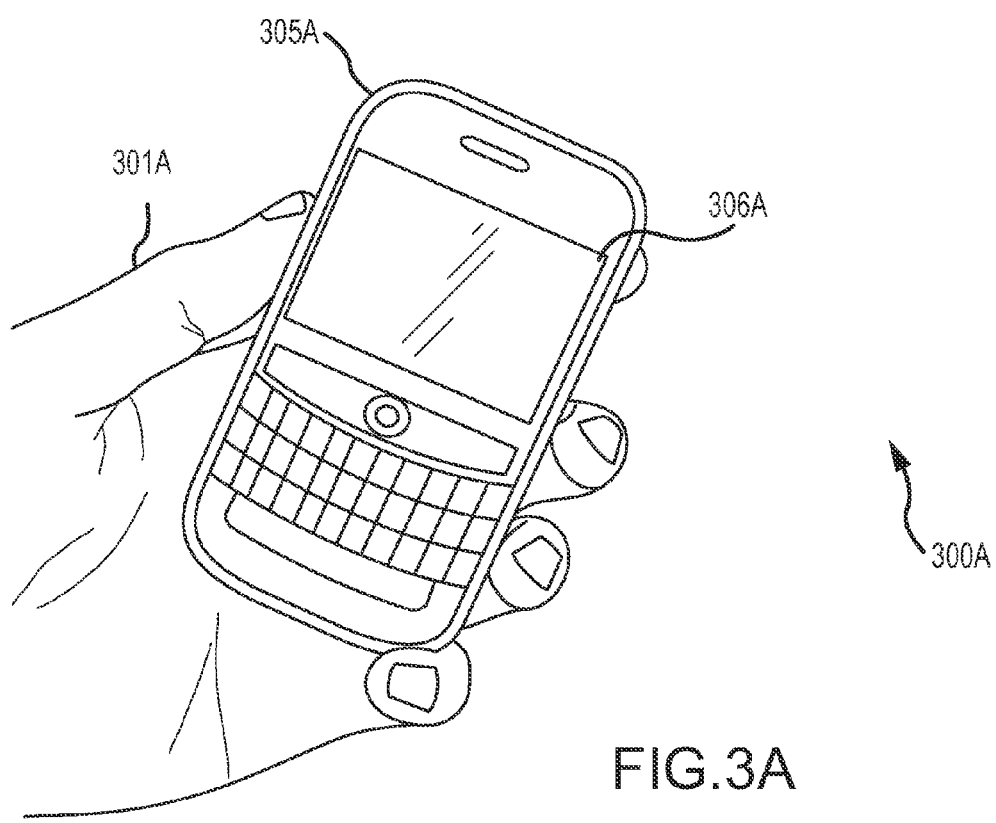
Figure 3B:
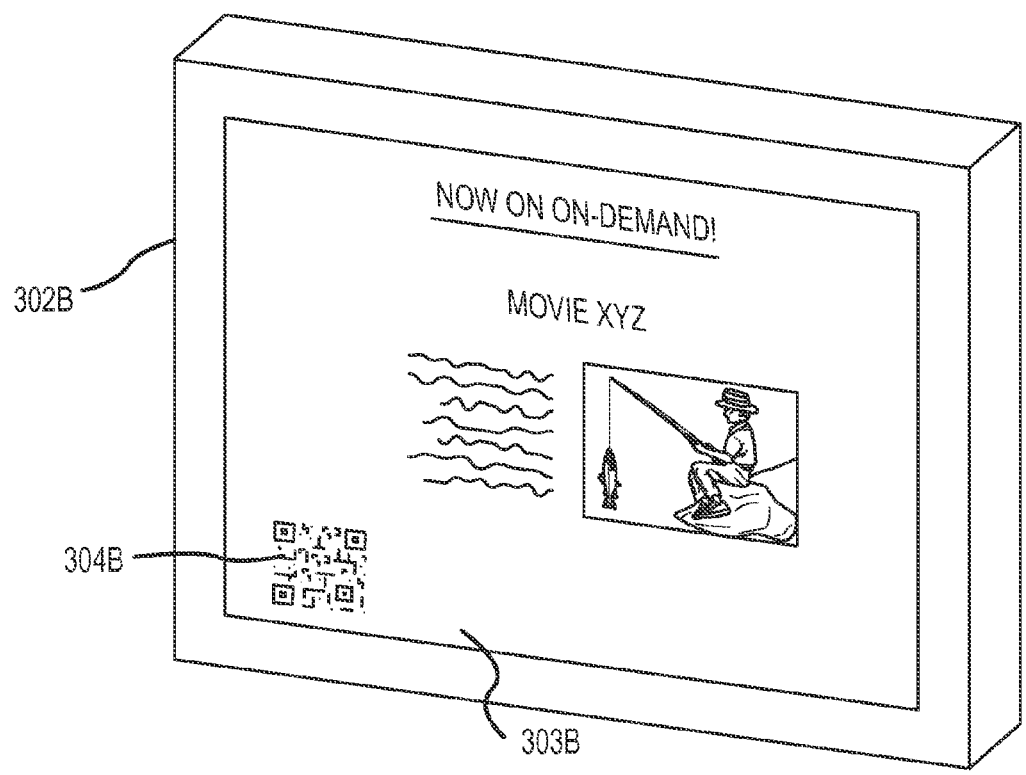
Figure 3B:
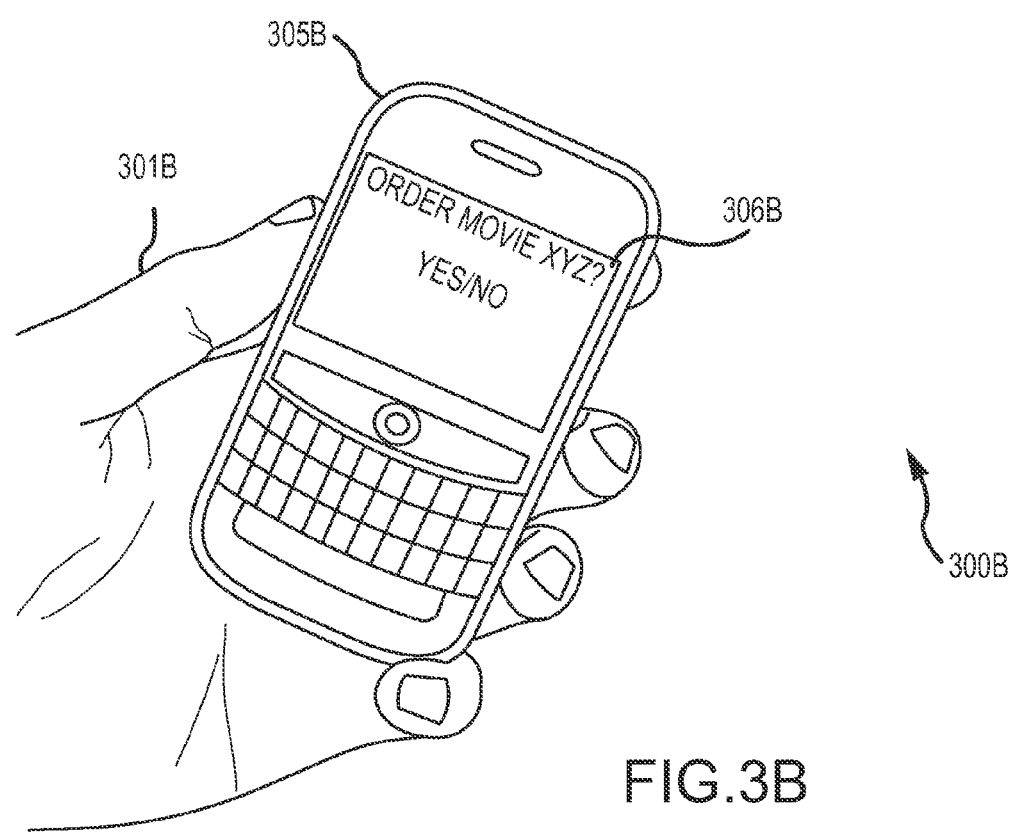
Figure 3C:
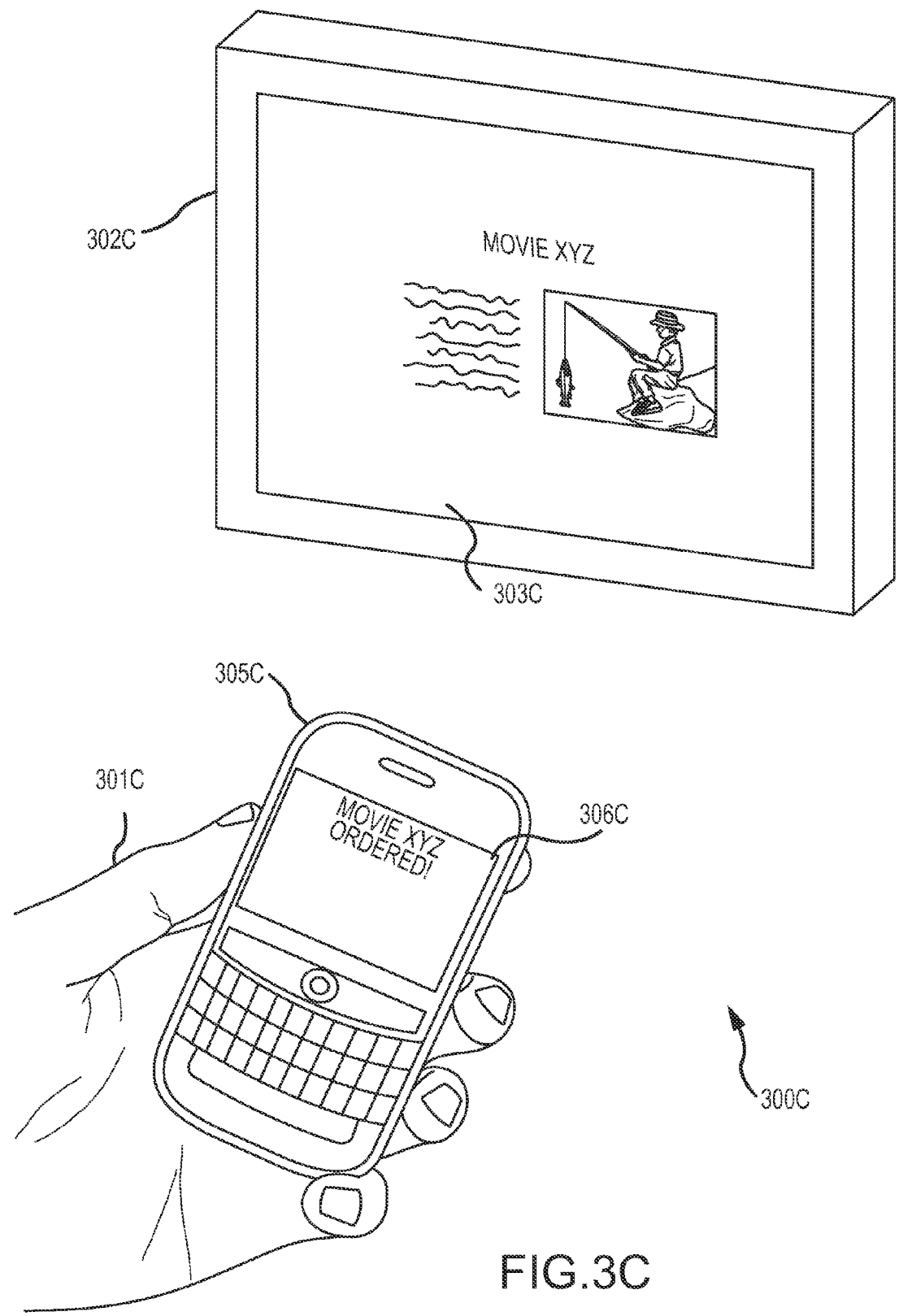

FIGS. 3A-3C illustrate an example system 300A-300C where a user 301A-301B utilizes matrix codes dynamically generated by a content receiver 302A to order content. As illustrated in FIG. 3A, the system 300A includes a television 302A (which incorporates a programming receiver that receives programming from a programming provider for the television), a user 301A, and a cellular telephone 305A. In this example, the programming receiver of the television is able to receive programming from the content provider, but is not able to transmit messages to the content provider. However, the programming provider transmits a content identifier along with a commercial for Movie XYZ to the television. The content identifier includes information identifying Movie XYZ and a network address of a on-demand movie order server of the programming provider from which Movie XYZ can be ordered. The television derives information specific to the television which includes a unique identifier for the programming receiver of the television and the subscriber account number associated with the television and the programming provider. The television then dynamically generates a QR code 306A that includes the dynamically determined information specific to the television and the content identifier and displays the QR code on a television screen 303A along with the commercial for Movie XYZ. In order to order Movie XYZ, the user takes a picture of the QR code on the television screen with the cellular telephone which is executing a QR code reader program. The QR code reader program detects and decodes the QR code. Based on the decoded content identifier, the cellular phone initiates an order for Movie XYZ by transmitting the decoded information specific to the television to the on-demand movie order server of the programming provider.

As illustrated in FIG. 3B, when the programming provider receives the order for Movie XYZ, the programming provider transmits a confirmation request message back to the cellular telephone 305B and the cellular telephone displays the confirmation request message on a cellular telephone display 306B. In this example, the user utilizes the cellular telephone to select the "Yes" option in order to confirm the order of Movie XYZ and the cellular telephone transmits the user's response confirming the order to the programming provider. After receiving the confirmation, the programming provider transmits Movie XYZ to the programming receiver of the television 302C, which may then display the Movie XYZ on the television screen 303C. Additionally, after receiving the confirmation, the programming provider may transmit order confirmation message to the cellular telephone notifying the user 301C that Movie XYZ has been successfully ordered. As illustrated, the cellular telephone may then display the order confirmation message on the cellular telephone display 306C.

Although the system 100 illustrated in FIG. 1, the method 200 illustrated in FIG. 2, and the example system 300A-300C illustrated in FIG. 3A-3C illustrate and are described within the context of ordering instances of content to be transmitted to a content receiver, it is understood that this is merely illustrative. The described systems and methods may be utilized to order products which may be then sent to a user location (such as a home, business, and so on) without departing from the present disclosure.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for ordering utilizing dynamic matrix code generation, the method comprising:
   receiving at least one identifier at a content receiver from a content provider wherein the at least one identifier identifies ordering information for at least one of at least one instance of content or at least one product;
   deriving, utilizing the content receiver, information specific to the content receiver;
   dynamically generating, utilizing the content receiver, at least one matrix code including the at least one identifier and the information specific to the content receiver; and
   transmitting, utilizing the content receiver, the at least one matrix code to at least one display device wherein the at least one matrix code is decodable by at least one reader device that optically detects the at least one matrix code displayed on the at least one display device to initiate at least one order for at least one of the at least one instance of content to be transmitted to the content receiver or the at least one product.

2. The method of claim 1, wherein the at least one matrix code comprises at least one QR code.

3. The method of claim 1, wherein the information specific to the content receiver includes at least one of an identifier for the content receiver, a customer identifier related to the content receiver, account information for a content account associated with the content provider, or financial information associated with the content receiver.

4. The method of claim 1, further comprising receiving the at least one instance of content at the content receiver.

5. The method of claim 1, wherein the ordering information for the at least one of the at least one instance of content or the at least one product includes information for transmitting the information specific to the content receiver to a provider of the at least one instance of content to initiate the at least one order for the at least one instance of content.

6. The method of claim 5, wherein the provider of the at least one instance of content comprises the content provider wherein the content provider transmits the at least one instance of content to the content receiver in response to receiving the at least one order for the at least one instance of content.

7. The method of claim 5, wherein the provider of the at least one instance of content comprises a provider other than the content provider wherein the provider transmits the at least one instance of content to the content provider in response to receiving the at least one order for the at least one instance of content and the content provider then transmits the at least one instance of content to the content receiver.

8. The method of claim 5, wherein the provider of the at least one instance of content transmits a confirmation message in response to receiving the at least one order for the at least one instance of content and then transmits the at least one instance of content upon receipt of a response to the confirmation message.

9. The method of claim 1, wherein the content receiver receives content from the content provider and said operation of transmitting, utilizing the content receiver, the at least one matrix code to at least one display device further comprises:
   combining the content with the at least one matrix code; and
   transmitting the combined content and at least one matrix code to the at least one display device.

10. A content receiver, comprising:
    at least one input component that receives at least one identifier from a content provider wherein the at least one identifier identifies ordering information for at least one of at least one instance of content or at least one product;
    at least one processing unit, communicably coupled to the at least one input component, that derives information specific to the content receiver and dynamically generates at least one matrix code including the at least one identifier and the information specific to the content receiver; and
    at least one output component, communicably coupled to the at least one processing unit, that transmits the at least one matrix code to at least one display device;
    wherein the at least one matrix code is decodable by at least one reader device that optically detects the at least one matrix code displayed on the at least one display device to initiate at least one order for at least one of the at least one instance of content to be transmitted to the at least one input component or the at least one product.

11. The content receiver of claim 10, wherein the at least one matrix code comprises at least one QR code.

12. A system for content ordering utilizing dynamic matrix code generation, comprising:
    at least one input component that receives at least one identifier from a content provider wherein the at least one identifier identifies ordering information for at least one instance of content or at least one product;
    at least one processing unit that derives information specific to the content receiver and dynamically generates at least one matrix code including the at least one identifier and the information specific to the content receiver;
    at least one output component that transmits the at least one matrix code to at least one display device; and
    a provider of at least one of the at least one instance of content or the at least one product;
    wherein the at least one matrix code is decodable by at least one reader device that optically detects the at least one matrix code displayed on the at least one display device to initiate at least one order for at least one of the at least one instance of content to be transmitted from the provider of at least one of the at least one instance of content or the at least one product to the at least one input component or the at least one product.

13. The system of claim 12, wherein the at least one matrix code comprises at least one QR code.

14. The system of claim 12, wherein the provider of the at least one of the at least one instance of content or the at least one product comprises a provider of the at least one instance of content and the at least one order for the at least one instance of content or the at least one product comprises at least one order for the at least one instance of content and wherein the ordering information for the at least one instance of content includes information for transmitting the information specific to the content receiver to a provider of the at least one instance of content to initiate the at least one order for the at least one instance of content.

15. The system of claim 14, wherein the provider of the at least one instance of content comprises the content provider and the content provider transmits the at least one instance of content to the at least one input component in response to receiving the at least one order for the at least one instance of content.

16. The system of claim 14, wherein the provider of the at least one instance of content comprises a provider other than the content provider and the provider transmits the at least one instance of content to the content provider in response to receiving the at least one order for the at least one instance of content and the content provider then transmits the at least one instance of content to the at least one input component.

17. The system of claim 14, wherein the provider of the at least one instance of content transmits a confirmation message in response to receiving the at least one order for the at least one instance of content and then transmits the at least one instance of content upon receipt of a response to the confirmation message.

18. The system of claim 12, wherein the at least one input component receives content from the content provider, the at least one processing unit combines the content with the at least one matrix code, and the at least one output component transmits the at least one matrix code to the at least one display device the by transmitting the combined content and at least one matrix code to the at least one display device.

19. The system of claim 12, wherein the at least one input component receives the at least one instance of content and the at least one output component transmits the received at least one instance of content to the at least one display device.

20. The system of claim 12, wherein the information specific to the content receiver includes at least one of an identifier for the content receiver, a customer identifier related to the content receiver, account information for a content account associated with the content provider, or financial information associated with the content receiver.

* * * * *